G. H. HARRIS.
LOCK NUT.
APPLICATION FILED SEPT. 8, 1915.
1,236,838.
Patented Aug. 14, 1917.
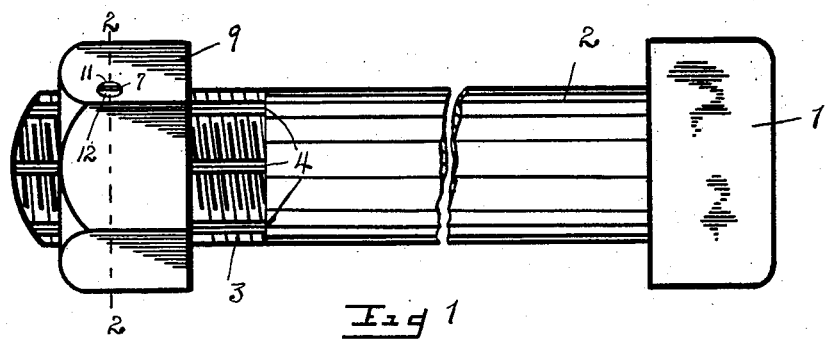
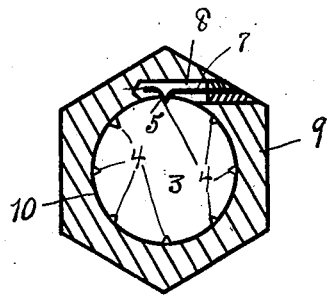
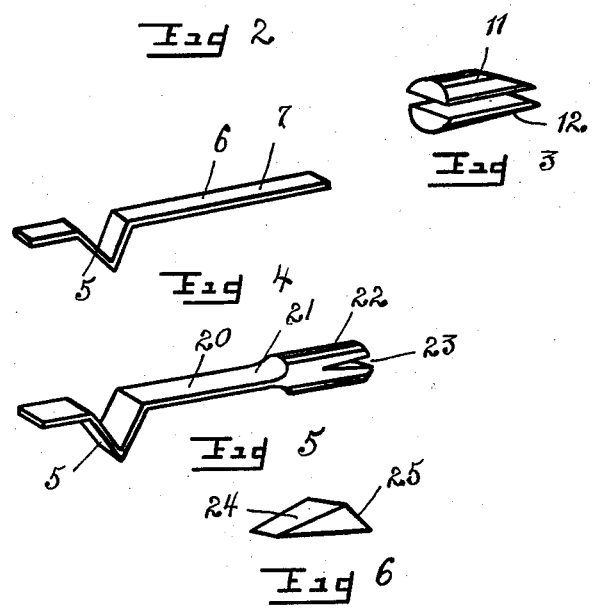
INVENTOR
GEORGE H. HARRIS
BY
*Thomas L. Wilder*
ATTORNEY

UNITED STATES PATENT OFFICE.

GEORGE HOWARD HARRIS, OF UTICA, NEW YORK.

LOCK-NUT.

1,236,838.

Specification of Letters Patent.

Patented Aug. 14, 1917.

Application filed September 8, 1915. Serial No. 49,449.

*To all whom it may concern:*

Be it known that I, GEORGE H. HARRIS, citizen of the United States, residing at Utica, in the county of Oneida and State of New York, have invented certain new and useful Improvements in Lock-Nuts, of which the following is a specification, reference being had therein to the accompanying drawing.

My invention relates to a lock nut, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a simple, inexpensive, efficient nut that is adapted to be held in given set position upon a bolt, so that it will not be loosened therefrom by the constant vibration and jar of the parts to which the bolt is attached. Such a nut will be found particularly useful upon the railroads in securing the rails and upon automobiles in securing the parts thereof, which are subject to considerable vibration.

The nut can be turned on or off from the bolt in the usual manner heretofore employed, without any special device, for it is constructed with a yielding V-shaped pawl which will automatically engage certain V-shaped longitudinal grooves, whereby to hold the nut in given position upon the bolt, or to yield when being turned.

This object will be readily seen from the drawings in which:

Figure 1 is a side elevation of a bolt, broken in the middle portion to conserve space, and showing the nut applied thereto;

Fig. 2 is a sectional view taken on the line 2—2 of Fig. 1, parts being shown in full;

Fig. 3 is an enlarged perspective view of certain wedges employed;

Fig. 4 is an enlarged perspective view of a spring and V-shaped pawl employed;

Fig. 5 is an enlarged perspective view of a modified form of spring and V-shaped pawl;

Fig. 6 is an enlarged perspective view of a modified form of wedge used in connection with the modified form of spring illustrated in Fig. 5.

Referring more particularly to the drawings, a bolt having a head —1— is represented by 2. The bolt 2 is provided with the threads 3 adjacent one end thereof in which threads are formed the V-shaped longitudinal grooves 4 adapted to be engaged by the double faced or V-shaped pawl 5 integral with the spring 6, said pawl 5 being formed by bending the spring 6 into a V adjacent the free end. The spring 6 has a long shank 7 and is adapted to be held within the cylindrical recess 8 formed in the nut 9. The nut 9 has also a threaded aperture 10 for the projection of the threaded end 3 of the bolt 2.

The end of the shank 7 of the spring 6 is held within the recess 8 of the nut 9 by the sector wedges 11—12, illustrated in Fig. 3, which are forced into the recess 8 on either side of the said shank so as to form a drive fit therein. The outer surfaces of the wedges 11 and 12 are beveled to fit flush with the adjacent surface of the nut 9. The other or free end of the spring 6, including the V-shaped pawl 5 is allowed a limited amount of movement within the adjacent portion of the recess 8. The recess 8 is disposed at right angles to the axis of the aperture 10 of the nut 9, whereby the V-shaped pawl 5 will be permitted to engage the V-shaped longitudinal grooves 4 of the bolt 2 in a complete or flush fitting manner as shown in Fig. 2.

The operation of turning the nut 9 on or off the bolt 2 is effected by applying an ordinary wrench to the nut and then turning the same in the usual manner. As the nut 9 turns in either direction upon the bolt 2, the V-shaped pawl 5 will ride over the V-shaped longitudinal grooves 4 of the bolt 2. Although the V-shaped pawl 5 will ride out of the V-shaped longitudinal grooves 4 of the bolt 2, when a wrench is applied to said nut 9, said pawl will not do so because of any vibration that might occur. Immediately the nut 9 comes to rest with the V-shaped pawl 5 opposite any one of the V-shaped longitudinal grooves 4, the pawl 5 will snap therein, because of the normal pressure of the spring 6, and thereby hold the nut 9 in given set position and from turning upon the bolt 2. In order to again turn the nut 9, a very little pressure exerted thereon will cause the V-shaped pawl 5 to ride up out of the V-shaped longitudinal groove 4, into which it has been disposed and thereby permit the turning of the nut 9 in either direction.

Figs. 5 and 6 show a modified manner of securing the shank 7 of the spring 6 within the recess 8 of the nut 9. This construction embodies the formation on the shank 20 of the spring 21 of a cylindrical end 22 having a split 23. A wedge 24 is disposed within the split 23 of the end 22, after the spring 21 is placed in assembled position, and driven therein, whereby to spread the end 22, so as to cause the same to bind against the contiguous sides of the recess 8 of the nut 9 to hold the spring 21 secure. The end 25 of the wedge 24 is beveled, so as to lie flush with the surface of the nut 9, when said wedge is driven home into the aperture or split 23.

The wedges 11 and 12 may be formed integral with the end of the shank 7 of the spring 6, whereby to form a cylindrical portion adapted to be forced into the recess 8 of the nut 9 with a drive fit, the peripheral edge being punched over into a close contact with the contiguous surface of the recess 8, whereby to hold the spring 6 securely in position.

Having thus described my invention, what I claim as new and desire to secure by Letters Patent is:

1. In a lock nut, a spring having a V-shaped pawl disposed within a closed recess for holding a nut in given position upon a bolt, and a wedge for securing said spring within said nut.

2. In a lock nut, having a threaded aperture for the passage of a bolt, a spring having a V-shaped pawl, a recess in said nut for the disposition of said spring, and said spring having a cylindrical end adapted to be forced into said recess and its peripheral edge punched down into engagement with the walls of said recess, whereby to hold said spring in assembled position.

3. In a lock nut having a threaded aperture for the passage of a bolt, a spring disposed in a recess arranged on a tangent to said first named aperture, a V-shaped pawl formed on the free end of said spring, whereby to engage a recess in said bolt to hold said nut in given position thereon, and said spring having a cylindrical end with a split adapted to be engaged by a wedge for holding said spring in assembled position in said second named recess.

In testimony whereof I have affixed my signature.

GEORGE HOWARD HARRIS.

Copies of this patent may be obtained for five cents each, by addressing the "Commissioner of Patents, Washington, D. C."